(12) United States Patent
Duan (10) Patent No.: US 8,531,971 B2
(45) Date of Patent: Sep. 10, 2013

(54) METHOD FOR CONTROLLING CHARGING OF PACKET DATA SERVICE

(75) Inventor: Xiaoqin Duan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 84 days.

(21) Appl. No.: 13/277,506

(22) Filed: Oct. 20, 2011

(65) Prior Publication Data
US 2012/0033560 A1 Feb. 9, 2012

Related U.S. Application Data (63) Continuation of application No. 13/190,817, filed on Jul. 26, 2011, which is a continuation of application No. 11/502,921, filed on Aug. 11, 2006, now Pat. No. 8,009,573, which is a continuation of application No. PCT/CN2005/000388, filed on Mar. 28, 2005.

(30) Foreign Application Priority Data

Apr. 1, 2004 (CN) .......................... 2004 1 0030955
Apr. 9, 2004 (CN) .......................... 2004 1 0033721

(51) Int. Cl.
*H04L 12/28* (2006.01)
*H04L 12/56* (2011.01)
*H04W 4/00* (2009.01)
*G06F 15/173* (2006.01)

(52) U.S. Cl.
USPC ........... 370/241; 370/328; 370/395; 455/406; 709/223

(58) Field of Classification Search
USPC ......... 370/252–259, 328–389; 455/405–422; 709/219–229
See application file for complete search history.

(56) References Cited

U.S. PATENT DOCUMENTS

| | | | |
|---|---|---|---|
| 5,598,417 A | 1/1997 | Crisler et al. |
| 5,757,894 A | 5/1998 | Kay et al. |
| 5,790,642 A | 8/1998 | Taylor et al. |
| 5,917,897 A | 6/1999 | Johnson et al. |
| 5,963,625 A | 10/1999 | Kawecki et al. |
| 6,023,499 A | 2/2000 | Mansey et al. |

(Continued)

FOREIGN PATENT DOCUMENTS

| | | |
|---|---|---|
| CN | 1222017 A | 7/1999 |
| CN | 1444824 A | 9/2003 |

(Continued)

OTHER PUBLICATIONS

Communication from the European Patent Office in Application No. 05 738 259.0-1525 dated Jan. 16, 2008.

(Continued)

*Primary Examiner* — Man Phan
(74) *Attorney, Agent, or Firm* — Staas & Halsey LLP (57) ABSTRACT

A method for controlling the charging of packet data service is disclosed, which includes: monitoring a number of event triggers; and when one of the event triggers is met, a TPF requesting charging rules from a CRF. In this way, the timing that the TPF requests charging rules from the CRF becomes controllable, and redundant information caused by the unnecessary charging rule from the TPF becomes avoidable, which enables interaction between the TPF and the CRF more effective and the charging control of packet data service reasonable and perfect.

11 Claims, 8 Drawing Sheets

(56) References Cited

U.S. PATENT DOCUMENTS

| | | | |
|---|---|---|---|
| 6,434,380 | B1 | 8/2002 | Andersson et al. |
| 6,985,567 | B2 | 1/2006 | Vallinen et al. |
| 7,017,050 | B2 | 3/2006 | Dalton, Jr. et al. |
| 7,203,301 | B1 | 4/2007 | Mudd et al. |
| 7,260,193 | B2 | 8/2007 | Zackrisson et al. |
| 7,266,116 | B2 | 9/2007 | Halpern |
| 7,391,854 | B2 | 6/2008 | Salonen et al. |
| 7,689,203 | B2 | 3/2010 | Zhang et al. |
| 7,831,247 | B2 * | 11/2010 | Gabor et al. ............. 455/422.1 |
| 7,843,860 | B2 * | 11/2010 | Boman ......................... 370/310 |
| 7,889,650 | B2 * | 2/2011 | Duan ........................... 370/230 |
| 7,948,990 | B2 * | 5/2011 | Hurtta et al. ............. 370/395.2 |
| 7,957,719 | B2 * | 6/2011 | Wu ............................... 455/406 |
| 8,009,573 | B2 * | 8/2011 | Duan ........................... 370/252 |
| 2002/0101858 | A1 | 8/2002 | Stuart et al. |
| 2002/0129088 | A1 | 9/2002 | Zhou et al. |
| 2002/0138331 | A1 | 9/2002 | Hosea et al. |
| 2002/0152319 | A1 | 10/2002 | Amin |
| 2002/0174212 | A1 * | 11/2002 | Casati et al. ................. 709/223 |
| 2002/0188562 | A1 | 12/2002 | Igarashi et al. |
| 2003/0014367 | A1 | 1/2003 | Tubinis |
| 2003/0125013 | A1 | 7/2003 | Mizell et al. |
| 2003/0152039 | A1 | 8/2003 | Roberts |
| 2003/0153333 | A1 | 8/2003 | Shirai et al. |
| 2003/0165222 | A1 | 9/2003 | Syrjala et al. |
| 2003/0200313 | A1 | 10/2003 | Peterka et al. |
| 2004/0017905 | A1 | 1/2004 | Warrier et al. |
| 2004/0125755 | A1 | 7/2004 | Roberts |
| 2004/0127194 | A1 | 7/2004 | Lippelt |
| 2004/0162054 | A1 * | 8/2004 | Thiebot ........................ 455/406 |
| 2004/0255025 | A1 | 12/2004 | Ricagni |
| 2005/0135264 | A1 | 6/2005 | Popoff et al. |
| 2006/0050711 | A1 | 3/2006 | Lialiamou et al. |
| 2006/0234674 | A1 | 10/2006 | Koskinen et al. |
| 2007/0033274 | A1 * | 2/2007 | Duan ............................. 709/223 |
| 2007/0115861 | A1 * | 5/2007 | Zhang et al. .................. 370/259 |
| 2007/0124160 | A1 * | 5/2007 | Duan et al. ......................... 705/1 |
| 2007/0165803 | A1 * | 7/2007 | Duan ....................... 379/114.03 |
| 2007/0185809 | A1 * | 8/2007 | Duan ............................... 705/39 |
| 2008/0320564 | A1 * | 12/2008 | Duan .................................. 726/4 |
| 2011/0103261 | A1 * | 5/2011 | Duan .............................. 370/254 |
| 2011/0207432 | A1 * | 8/2011 | Wu ................................. 455/406 |
| 2011/0251936 | A1 * | 10/2011 | Zhang et al. ..................... 705/30 |
| 2011/0280192 | A1 | 11/2011 | Duan |

FOREIGN PATENT DOCUMENTS

| | | |
|---|---|---|
| CN | 1452333 A | 10/2003 |
| CN | 1472920 A | 2/2004 |
| CN | 1303781 C | 3/2007 |
| JP | 10-136126 | 5/1998 |
| JP | 10136125 A | 5/1998 |
| JP | 2003-152778 | 5/2003 |
| JP | 2003-338829 | 11/2003 |
| JP | 2003338829 A | 11/2003 |
| WO | WO 01/39483 | 5/2001 |
| WO | WO 01/67706 | 9/2001 |
| WO | WO 01/91446 | 11/2001 |
| WO | WO 02/093835 | 11/2002 |
| WO | WO 2004/036890 | 4/2004 |
| WO | WO 2006/075042 A1 | 7/2006 |

OTHER PUBLICATIONS

ETSI TS 132 015 V3.12.0, "ETSI", pp. 1-66, (Dec. 2003).
Chinese Office Action in Chinese Application No. 2004100337219 mailed Oct. 21, 2005.
International Search Report from the European Patent Office in International Application No. EP 05 73 8259 mailed Feb. 12, 2007.
Extended Search Report from the European Patent Office in International Application No. EP 11 16 0837 mailed May 10, 2011.
Office Action in U.S. Appl. No. 11/502,921 mailed Nov. 12, 2009.
Second Office Action in U.S. Appl. No. 11/502,921 mailed Jul. 13, 2010.
Third Office Action in U.S. Appl. No. 11/502,921 mailed Dec. 8, 2010.
Fourth Office Action in U.S. Appl. No. 11/502,921 mailed Feb. 24, 2011.
Fifth Office Action in U.S. Appl. No. 11/502,921 mailed Mar. 24, 2010.
Final Rejection for Japanese Patent Application No. 2007-503178 dated Dec. 15, 2009.
3GPP TS 21.125, "$3^{rd}$ Generation Partnership Project; Technical Specification Group Services and System Aspects; Overall High Level Functionally and Architecture Impacts of Flow Based Charging; Stage 2 (Release 6)", V.6.0.0, pp. 1-30, (Mar. 2004).
Notice of Allowance mailed Apr. 27, 2011, issued in related U.S. Appl. No. 11/502,921 (9 pages).
EPO Extended Search Report mailed May 18, 2011, issued in related European Patent Application No. 11160837.8 (5 pages).
EPO Supplemental European Search Report mailed Feb. 22, 2007, issued in related European Patent Application No. 05738259.0 (4 pages).
EPO Examination Report mailed May 11, 2007, issued in related European Patent Application No. 05738259.0 (3 pages).
Preliminary Notice of Rejection with partial English translation dated Jul. 14, 2009, issued in related Japanese Application No. 2007-503178 (3 pages).
Notice of Final Rejection with partial English translation dated Dec. 15, 2009, issued in related Japanese Application No. 2007-503178 (3 pages).
Preliminary Notice of Rejection with partial English translation dated Apr. 24, 2012, issued in related Japanese Application No. 2010-091482 (3 pages).
PCT International Search Report mailed Jun. 9, 2005, issued in related International Application No. PCT/CN2005/000388 (4 pages).
PCT Written Opinion of the International Searching Authority mailed Jun. 9, 2005, issued in related International Application No. PCT/CN2005/000388 (3 pages).
Japanese Office Action mailed Jan. 8, 2013 in corresponding Japanese Patent Application No. 2010-091482.
U.S. Appl. No. 13/190,187, filed Jun. 26, 2011, Xiaoqin Duan, Huawei Technologies Co., Ltd.
Office Action, dated Feb. 25, 2013, in corresponding U.S. Appl. No. 13/190,817 (21 pp.).
Office Action (partial translation) from the Japanese Patent Office relating to Application No. 2010-091482; mailed Apr. 24, 2012; (Japanese version enclosed) (3 pgs.).

* cited by examiner

METHOD FOR CONTROLLING CHARGING OF PACKET DATA SERVICE

CROSS-REFERENCE TO RELATED APPLICATIONS

This application is a continuation of U.S. patent application Ser. No. 13/190,817, filed on Jul. 26, 2011, which is a continuation of U.S. patent application Ser. No. 11/502,921, now U.S. Pat. No. 8,009,573, filed on Aug. 11, 2006 and issued on Aug. 30, 2011, respectively. The U.S. Pat No. 8,009, 573 is a continuation of International Application No. PCT/CN2005/000388, filed on Mar. 28, 2005, which claims priority to Chinese Patent Application No. 200410030955.8, filed on Apr. 1, 2004 and 200410033721.9, filed on Apr. 9, 2004. The afore-mentioned patent and patent applications are hereby incorporated by reference in their entireties.

FIELD OF THE TECHNOLOGY

The present invention relates to a method of charging, and more specifically to a method of charging control for packet data service.

BACKGROUND OF THE INVENTION

With the wide application of packet data service, how to charge packet data service accurately and reasonably has become a common concern of operators.

Figure 1:
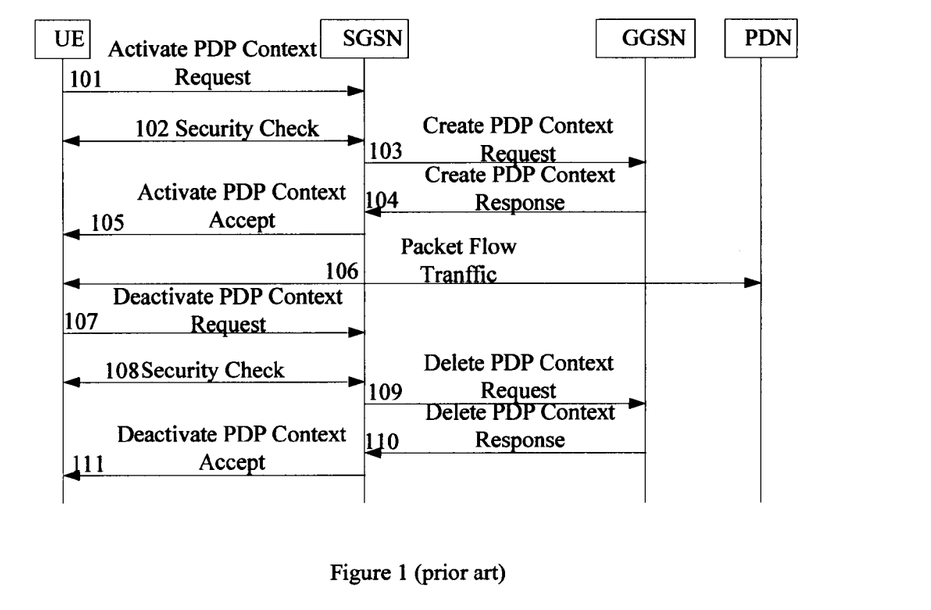
FIG. 1 is a flowchart illustrating a flow of PDP Context Activation, data transmission and De-activation.

FIG. 1 is a flowchart illustrating an activation, data transmission and de-activation of a Packet Data Protocol Context (PDP Context). As shown in FIG. 1, in General Packet Radio Service (GPRS), an implementing procedure of PDP Context activation, data transmission and de-activation includes the following steps:

Step 101: A User Equipment (UE) sends an Activate PDP Context Request to a Serving GPRS Support Node (SGSN), and this Activate PDP Context Request carries information of a Network Layer Service Access Point Identifier (NSAPI), PDP type, an Access Point Name (APN), a plurality of Quality of Service (QoS) parameters, a Transaction Identifier (TI) and so on, where NSAPI is used as a component of a Tunnel Identifier (TEID) between the SGSN and a Gateway GPRS Support Node (GGSN) to identify the PDP Context. The PDP Type includes the Peer-Peer Protocol (PPP) type, Internet Protocol (IP) type, etc. The APN may be provided for the SGSN by the UE, by which the SGSN addresses a corresponding GGSN and the GGSN determines the external network to be accessed by the UE, or the UE may choose not to provide the APN for the SGSN, in that case, the SGSN selects the default APN according to the subscriber information of the UE. The QoS parameters represent the quality required by the packet data service specified by the UE. The TI is used for the UE to identify a PDP context.

Step 102: After receiving the Activate PDP Context Request, the SGSN performs a security check and encryption with the UE, and this step is optional.

Step 103: the SGSN analyses GGSN address information according to the APN, if the SGSN finds the GGSN address information according to the APN, the TEID is created for the PDP Context. The TEID may be a combination of an International Mobile Subscriber Identity (IMSI) and the NSAPI to uniquely identify a PDP Context between SGSN and GGSN. Then the SGSN sends a Create PDP Context Request to the GGSN and the Create PDP Context Request carries PDP type, PDP address, APN, QoS parameters, TEID, and a select mode. The PDP address is an IP address of the UE, which is an optional parameter. When a Create PDP Context Request doesn't carry a PDP address therein, the IP address may be allocated by the GGSN in the subsequent process, or by a Packet Data Network (PDN) that is finally connected with the UE. The select mode refers to an APN-selecting mode, namely whether the APN is selected by the UE or by the SGSN. If the GGSN address information is not accessed for the SGSN according to the APN, the SGSN rejects the Activate PDP Context Request from the UE.

Step 104: After receiving the Create PDP Context Request, the GGSN determines an external PDN according to the APN, then allocates a Charging ID, starts charging, and confers on QoS. The GGSN sends a Create PDP Context Response back to the SGSN, when the service quality requirement is met. The Create PDP Context Response carries the information of TEID, PDP address, Backbone Bearer protocol, QoS parameters, and Charging ID. When the GGSN does not meet the service quality requirement of the QoS parameters, the GGSN rejects the Create PDP Context Request from the SGSN, and then the SGSN rejects the Activate PDP Context Request from the UE.

Step 105: After receiving the Create PDP Context Response, the SGSN adds the NSAPI and the GGSN address information into the PDP Context in order to identify this PDP Context, selects wireless precedence according to QoS parameters, and then returns an Activate PDP Context Accept to the UE. The Activate PDP Context Accept carries the information of PDP type, PDP address, TI, QoS parameters, wireless precedence, and a number of PDP configuration options. Moreover, the SGSN starts charging. The UE receives the Activate PDP Context Accept and establishes a route with the GGSN. By this time the transmission channel between the UE and the PDN is established and data transmission is able to start.

Step 106: The UE transmits data with the PDN through the SGSN and the GGSN.

Step 107: On finishing the data transmission, the UE sends a Deactivate PDP Context Request to the SGSN and the Deactivate PDP Context Request carries the TI.

Step 108: After receiving the Deactivate PDP Context Request, the SGSN performs security checks and encryption with the UE, and this step is optional.

Step 109~Step 111: The SGSN sends a Delete PDP Context Request carrying the TEID to the GGSN. After receiving the Delete PDP Context Request, the GGSN ends the charging of the UE, deletes the PDP Context corresponding to the TEID, and then sends a to the SGSN. The Delete PDP Context Response carries the TEID. After receiving the Delete PDP Context Response, the SGSN ends the charging of the UE, deletes the PDP Context corresponding to the TEID, and then sends a Deactivate PDP Context Response carrying the TI to UE. After receiving the Deactivate PDP Context Response, the UE deletes the PDP Context corresponding to TI.

As shown in FIG. 1, in the present GRPS charging system, the charging starts when the PDP context is activated and comes to its end when the PDP context is de-activated, which means the present charging system can only charges according to a transmitted data flow or an activate time duration of the PDP context. In practice, however, after establishing a transmission channel with the PDN, the UE performs a plurality of services based on one activated PDP Context, i.e. if the PDN is able to provide a plurality of services, such as Send/Receive Email service, Wireless Application Protocol (WAP) based browse service, File Transfer Protocol (FTP) based file transfer service and so on, an activated PDP Context is able to bear various services provided by the PDN after the UE establishes a transmission channel with this PDN.

Meanwhile operators or service providers may adopt different charging approaches for different charging modes of various services, for instance, Send/Receive Email service may be charged based on trigger times of Sending and Receiving events, WAP browse service may be charged according to flow, file transfer service may also be charged according to flow, and yet, a charging rate of WAP browse service is different from that of file transfer service. Thus, it is totally impossible to perform separate charging with the existing GPRS charging system for different services the same PDP Context bears.

In view of the above, it is being discussed in the 3rd Generation Partnership Project (3GPP) as to how to implement IP Flow Based Charging (FBC). As far as a packet data service is concerned, all the transmitted and received IP Flows or IP Packets when a UE user uses the service may be called Service Data Flow, i.e. the Service Data Flow is a set of a plurality of IP Flows, therefore the IP Flow Based Charging can truly reflect the resource occupation of a certain service. The IP Flow Based Charging can be described like this: IP Flows of different services that the same PDP Context bears are separately screened out through some filters similar to sieves, then the IP Flows that are screened out by different filters are separately charged so as to reach the object of separately charging different Service Data Flows. In this way, a charging granularity based on IP Flows is far less than that based on a PDP Context. The charging granularity may be regard as the size of a hole of a sieve, therefore the charging granularity based on one PDP Context will be like a sieve hole determined by one PDP Context while the charging granularity based on IP Flow will be like a sieve hole determined by one IP Flow, that is, there will be more than one sieve holes contained in one PDP Context. Therefore, comparing with the charging based on one PDP Context, charging based on IP Flow can provide more charging approaches for operators or service providers.

Figure 2A:
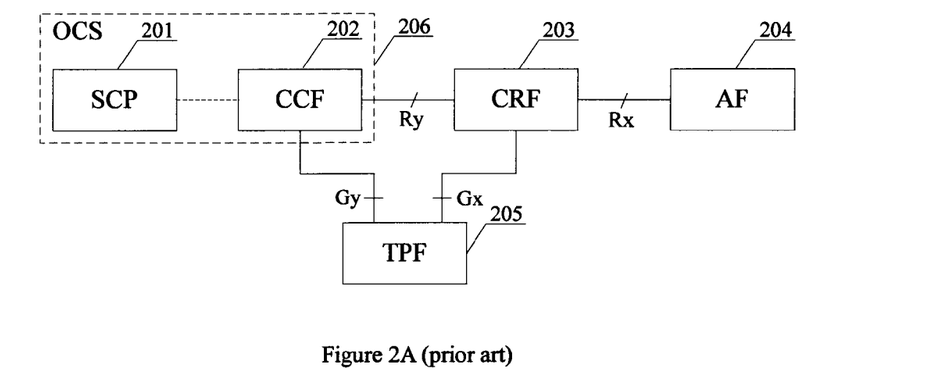
FIG. 2A is a schematic diagram illustrating a structure of online charging FBC system.

In 3GPP, aspects of FBC like system architectures, function requirement and flow of interactive messages are described. The FBC system architecture supporting online charging is shown in FIG. 2A, in which Online Charging System (OCS) 206 is composed of Service Control Point (SCP) 201 of Customized Application for Mobile Network Enhanced Logic (CAMEL) and a service data flow based Credit Control Function (CCF) 202. CCF 202 is connected with service data flow based Charging Rule Function (CRF) 203 through an interface Ry. The CRF 203 is connected with an Application Function (AF) 204 through an interface Rx and with the Traffic Plane Function (TPF) 205 through an interface Gx. The CCF 202 is connected with TPF 205 through an interface Gy.

Figure 2B:
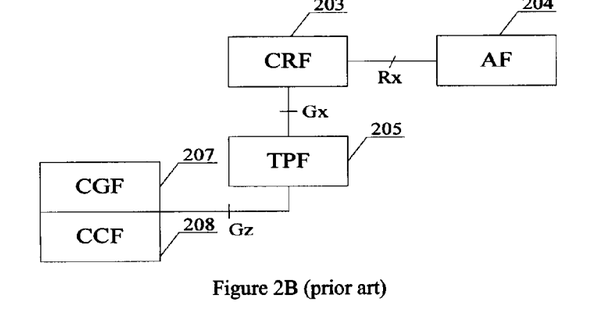
FIG. 2B is a schematic diagram illustrating a structure of offline charging FBC system.

The FBC system architecture supporting offline charging is shown in FIG. 2B, in which the CRF 203 is connected with the AF 204 through an interface Rx and with the TPF 205 through an interface Gx, and the TPF 205 is connected with a Charging Gateway Function (CGF) 207 and a Charging Collection Function (CCF) 208 respectively through Gz.

According to the 3GPP provision for functions implementing the FBC, the TPF 205 bears IP Flows. During and the establishment of the IP Flow bearer, the TPF 205 sends a Charging Rule Request to the CRF 203 through the Gx interface. The Charging Rule Request carries relevant information of subscriber and the UE, bearer characteristics, network information, and so on. The relevant information of subscriber and the UE may be a Mobile Station ISDN (MSISDN), an International Mobile Subscriber Identity (IMSI) and etc. In addition, the bearer may be modified during the IP Flow transmission. For example, when QoS parameters of the same service are different, charging rules may be different accordingly. For instance, the charging rate may be decrease as QoS parameters decrease. Therefore it is necessary to re-confer on QoS parameters. In this case, during the modification of the bearer, the TPF 205 resends a Charging Rule Request to the CRF 203 to request for new charging rules. The CRF 203 selects a proper charging rule according to the said input information provided by the TPF 205 and then returns the selected charging rule to the TPF 205. The charging rule includes information of charging mechanism, charging type, charging key, Service Data Flow Filter, and charging rule precedence. The charging mechanism may be online charging or offline charging. The charging type may be a type of time span based. The charging key is a parameter related with the charging rate, and the CRF 203 may provide only parameters related with the charging rate for the TPF 205, rather than directly provide the charging rate for the TPF 205. The Service Data Flow Filter is used to indicate the TPF 205 which IP Flows are to be filtered, and then the TPF 205 charges these filtered IP Flows according to the charging rules. Service Data Flow Filter may include IP quintuple having such information as Source/Destination IP Address, Source/Destination Port Number, and Protocol ID. For instance, the CRF 203 indicates the TPF 205 to filter the IP Flow with the Source IP Address 10.0.0.1, Destination IP Address 10.0.0.2, Source/Destination Port Number 20 and the protocol type Transmission Control Protocol (TCP), and then charges the filtered IP Flow according to the charging rule. Finally, during the deletion of the bearer, the TPF 205 may as well send a Charging Rule Request to the CRF 203 to request a new charging rule from the CRF. At this time, the CRF 203 may request the TPF 205 to delete the previously installed charging rule.

In addition, the CRF 203 may determine the charging rule according to the input information of the AF 204 or OCS 20 apart from the input information of the TPF 205. For example, the AF 204 may notify the CRF 203 of the current service type used by the user, and the CRF 203 may select the corresponding charging rule according to this service type.

For a GPRS network, the TPF 205 is the GGSN, the AF is a service gateway or a service server in the PDN and the CRF 203 is an added logical entity. The TPF 205 is the executing point of charging rules and the CRF 203 is the control point of charging rules.

Figure 3A:
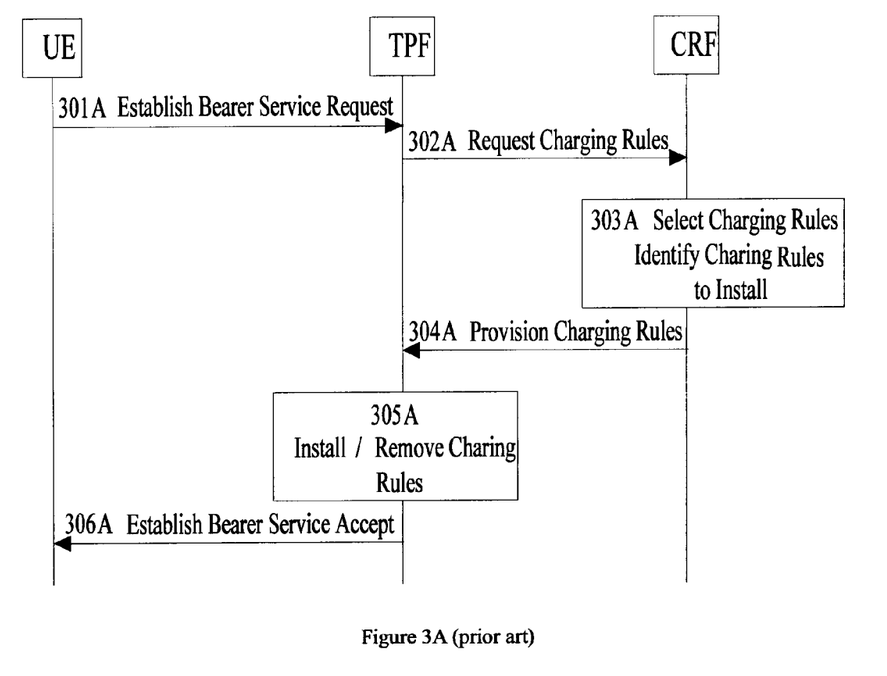
FIG. 3A is a flowchart of issuing charging rules when bearer is established.

FIG. 3A is the flow chart of issuing the charging rule when a bearer is established. As shown in FIG. 3A, the implementing procedure of issuing the charging rule when a bearer is established includes the following steps:

Step 301A: The UE sends an Establish Bearer Service Request to the TPF while in a GPRS network the corresponding process is that the GGSN receives a Create PDP Context Request.

Step 302A: After receiving the Establish Bearer Service Request, the TPF sends a Charging Rule Request to the CRF, and the Charging Rule Request carries the input information for the CRF to determine the charging rule.

Steps 303A~304A: After receiving the Charging Rule Request, the CRF selects a charging rule according to the input information carried by the Charging Rule Request, and then returns Provision Charging Rules. The Provision Charging Rules may carry the selected charging rule.

Steps 305A~306A: After receiving Provision Charging Rules, the TPF installs a new charging rule according to the charging rule selected by the CRF, or deletes the original charging rule, or installs a new charging rule while deleting the original one. Then the TPF receives the Establish Bearer Service Request initiated by the UE, returns an Establish Bearer Service Accept to the UE, and continues with the subsequent steps of the Establish Bearer process.

Figure 3B:
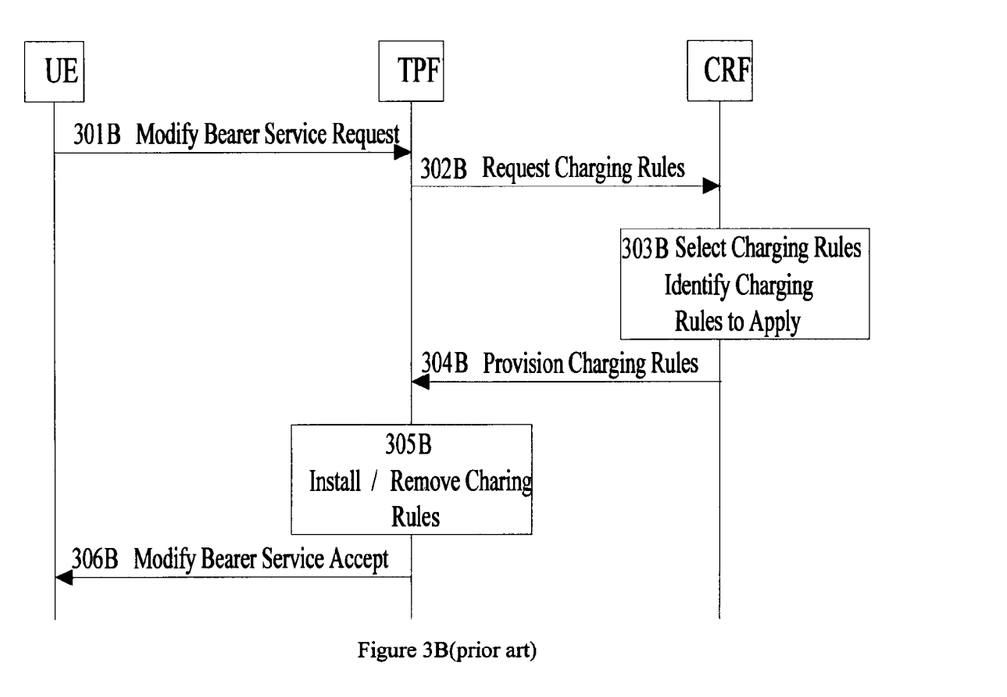
FIG. 3B is a flowchart of issuing charging rules when bearer is modified.

FIG. 3B is the flow chart of issuing the charging rule when a bearer is modified. As shown in FIG. 3B, the implementing procedure of issuing the charging rule when a bearer is modified includes the following steps:

Step 301B: The UE sends a Modify Bearer Service Request to the TPF while in a GPRS network the corresponding process is that the GGSN receives an Update PDP Context Request.

Step 302B: After receiving the Modify Bearer Service Request, the TPF sends a Charging Rule Request to the CRF, and the Charging Rule Request carries the input information for the CRF to determine the charging rule.

Steps 303B~304B: After receiving the Charging Rule Request, the CRF selects a charging rule according to the input information carried by this Charging Rule Request, and then returns Provision Charging Rules carrying the selected charging rule.

Steps 305B~306B: After receiving Provision Charging Rules, the TPF installs a new charging rule according to the charging rule selected by the CRF, or deletes the original charging rule, or installs a new charging rule while deleting the original one. Then the TPF receives the Modify Bearer Service Request initiated by UE, returns a Modify Bearer Service Accept to the UE, and continues with the subsequent steps of the Modify Bearer process.

Figure 3C:
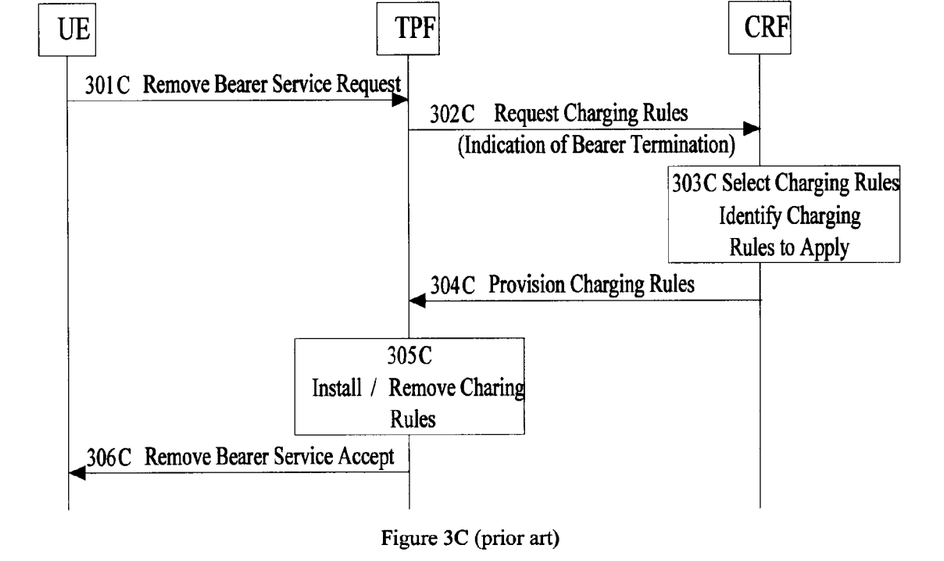
FIG. 3C is a flowchart of issuing charging rules when bearer is deleted.

FIG. 3C is the flow chart of issuing the charging rule when a bearer is deleted. As shown in FIG. 3B, the implementing procedure of issuing the charging rule when a bearer is deleted includes the following steps:

Step 301C: The UE sends a Remove Bearer Service Request to the TPF while in a GPRS network the corresponding process is that the GGSN receives a Delete PDP Context Request.

Step 302C: After receiving the Remove Bearer Service Request, the TPF sends a Charging Rule Request to the CRF, and the Charging Rule Request carries the input information for the CRF to determine the charging rule.

Steps 303C~304C: After receiving the Charging Rule Request, the CRF selects a charging rule according to the input information carried by this Charging Rule Request, and then returns Provision Charging Rules carrying the selected charging rule.

Steps 305C~306C: After receiving Provision Charging Rules, the TPF installs a new charging rule according to the charging rule selected by the CRF, or deletes the original charging rule, or installs a new charging rule while deleting the original one. Then the TPF returns a Remove Bearer Service Accept to the UE, accepts the Remove Bearer Service Request initiated by the UE and continues with the subsequent steps of the Remove Bearer process.

Figure 4:
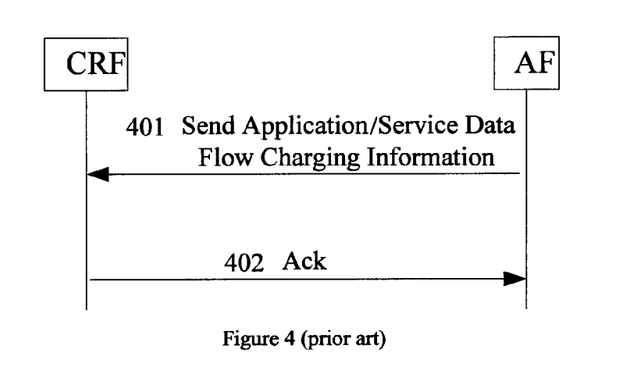
FIG. 4 is a flowchart of an AF providing charging input information for a CRF.

Besides, the CRF may also voluntarily send a charging rule to the TPF. For instance, in the data transmission process between the UE and the AF, after receiving the input information relating to charging of the AF, the CRF selects a proper charging rule according to the input information provided by the AF, and then voluntarily issues the selected charging rule to the TPF. The specific implementing procedure of the AF providing the input information of charging for the CRF is shown in FIG. 4:

Step 401: The AF sends Application/Service Data Flow Charging Information to the CRF.

Step 402: After receiving the Application/Service Data Flow Charging Information, the CRF returns an Acknowledgement (Ack) to the AF to notify the AF of already receiving the Application/Service Data Flow Charging Information sent by the AF.

Figure 5:
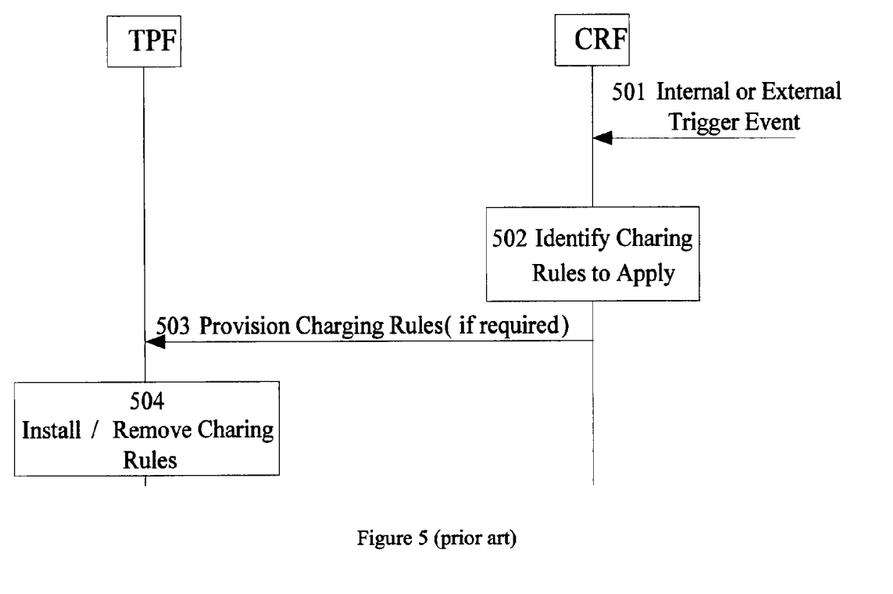
FIG. 5 is a flowchart of a CRF voluntarily issuing charging rules to a TPF.

FIG. 5 is the flow chart of the CRF voluntarily issuing the charging rule to the TPF. As shown in FIG. 5, the implementing procedure of the CRF voluntarily issuing the charging rule to the TPF includes the following steps:

Step 501: The CRF receives a certain Internal or External Trigger Event and relevant information about this event, such as the event of the AF sending the input information of charging rule selection to the CRF.

Step 502: The CRF selects the corresponding charging rule according to the acquired information. The acquired information may be the charging-relevant input information provided by the AF. For instance, the user is using a certain service of AF, and the service has special charging requirement, e.g., the charging rate is different from that of other services, therefore, the AF provides relevant charging information of this service for the CRF. The acquired information may also be the charging-relevant input information provided by TPF.

Step 503: The CRF sends the Provision Charging Rules to the TPF when needed, and the Provision Charging Rules may carry the selected charging rule.

Step 504: After receiving Provision Charging Rules, the TPF installs a new charging rule according to the charging rule selected by the CRF, or deletes the original charging rule, or installs a new charging rule while deleting the original one.

At present, the interactive mode concerning charging rule between the TPF and the CRF is defined in 3GPP Specification like this: The TPF sends a Charging Rule Request to the CRF when a certain trigger event is met. The trigger event may be an event of establishing, modifying or deleting the bearer. The CRF selects a proper charging rule according to the information carried in the Charging Rule Request and sends the selected charging rule to the TPF. In this way, the event trigger of the Charging Rule Request is controlled by the TPF. The event trigger of the Charging Rule Request shall be set in the TPF in advance. Whenever the event of establishing, modifying or deleting the bearer is met, the TPF sends the Charging Rule Request to the CRF. However, for some cases, the QoS parameters modified have little differences compared with original QoS parameters when the QoS parameters are modified during the modification of the bearer, and it is not necessary to modify the charging rules. In these cases, the CRF may select a charging rule similar to an original one to send to the TPF when the TPF sends the Charging Rule Request, thereby creating a great of redundant information.

SUMMARY OF THE INVENTION

In view of the above, a method for charging control of packet data service is provided so as to make charging control of packet data service reasonable and perfect.

The method includes the steps of monitoring, by a Traffic Plane Function (TPF), an event trigger provided by a Charging Rule Function (CRF); and sending, by the TPF, a charging rule request to the CRF, if the event trigger is met.

Preferably, event triggers each representing a bearer service modification are set by the CRF and then are provided to the TPF. The event triggers are set according to self-stored information in the CRF, or charging-relevant input information provided by an Application Function (AF), an Online Charging System (OCS), the TPF, or any combinations of the AF, the OCS, and the TPF. The TPF stores the event triggers received from the CRF and monitors if any of the event triggers is met.

Preferably, the request sent from the TPF to the CRF when one of the event triggers is met selectively includes an event identifier which indicates a corresponding trigger event, and then the CRF responses for the request by providing a charging rule in a charging rules provision procedure according to the trigger event.

In the preferred embodiments of the present invention, a plurality of event triggers is set such that the TPF requests corresponding charging rules from the CRF when one of the event triggers is met. This event trigger may be set in the TPF or be determined by the CRF. The CRF determines the event triggers according which the TPF needs to request charging rules therefrom and then sends the event triggers to the TPF. When one of the event triggers is met, the TPF requests the charging rules from the CRF and provides the charging-relevant input information to the CRF. Then the CRF selects a proper charging rule according to the charging-relevant input information and sends the selected charging rules to the TPF. In this way, it is possible to control the timing of the TPF requesting charging rules from the CRF, avoiding redundant information caused by the TPF when sending unwanted Charging Rule Requests to the CRF, thereby making the information interaction between the TPF and the CRF more effective and the charging control of packet data service more reasonable and perfect. In the preferred embodiments of the present invention, only static event triggers may be set in the TPF and the CRF does not need to provide any dynamic event trigger to the TPF, thereby deduce the message load between the TPF and the CRF.

In addition, since it is possible for the CRF to obtain charging-relevant input information provided by the AF or the OCS and the charging-relevant input information may affect the charging rules. According to the method of the preferred embodiments of the present invention, the CRF is able to flexibly set event triggers according to the charging-relevant input information and send the current event triggers to the TPF so that the TPF requests new charging rules from the CRF when a certain event trigger is met. In this way, flexible and various applications of charging rules may be implemented. However, functions mentioned above are completely impossible to be achieved by the existing methods of interaction between the TPF and the CRF.

DETAILED DESCRIPTION OF THE INVENTION

The preferred embodiments of the present invention will be described in detail hereinafter with reference to the accompanying drawings.

In the preferred embodiments of the present invention, a plurality of event triggers is set such that a TPF requests corresponding charging rules from a CRF when one of the event triggers is met. These event triggers may be set in the TPF or be determined by the CRF. The CRF determines the event triggers according which the TPF needs to request the charging rules therefrom, and then sends the event triggers to the TPF. When one of the event triggers is met, the TPF requests the charging rule from the CRF and provides charging-relevant input information. The CRF selects the proper charging rule according to the charging-relevant input information and sends the selected charging rule to the TPF. In this way, it is possible to control the timing of the TPF requesting charging rules from the CRF, avoiding redundant information caused by the TPF when sending unwanted Charging Rule Requests to the CRF.

Figure 6:
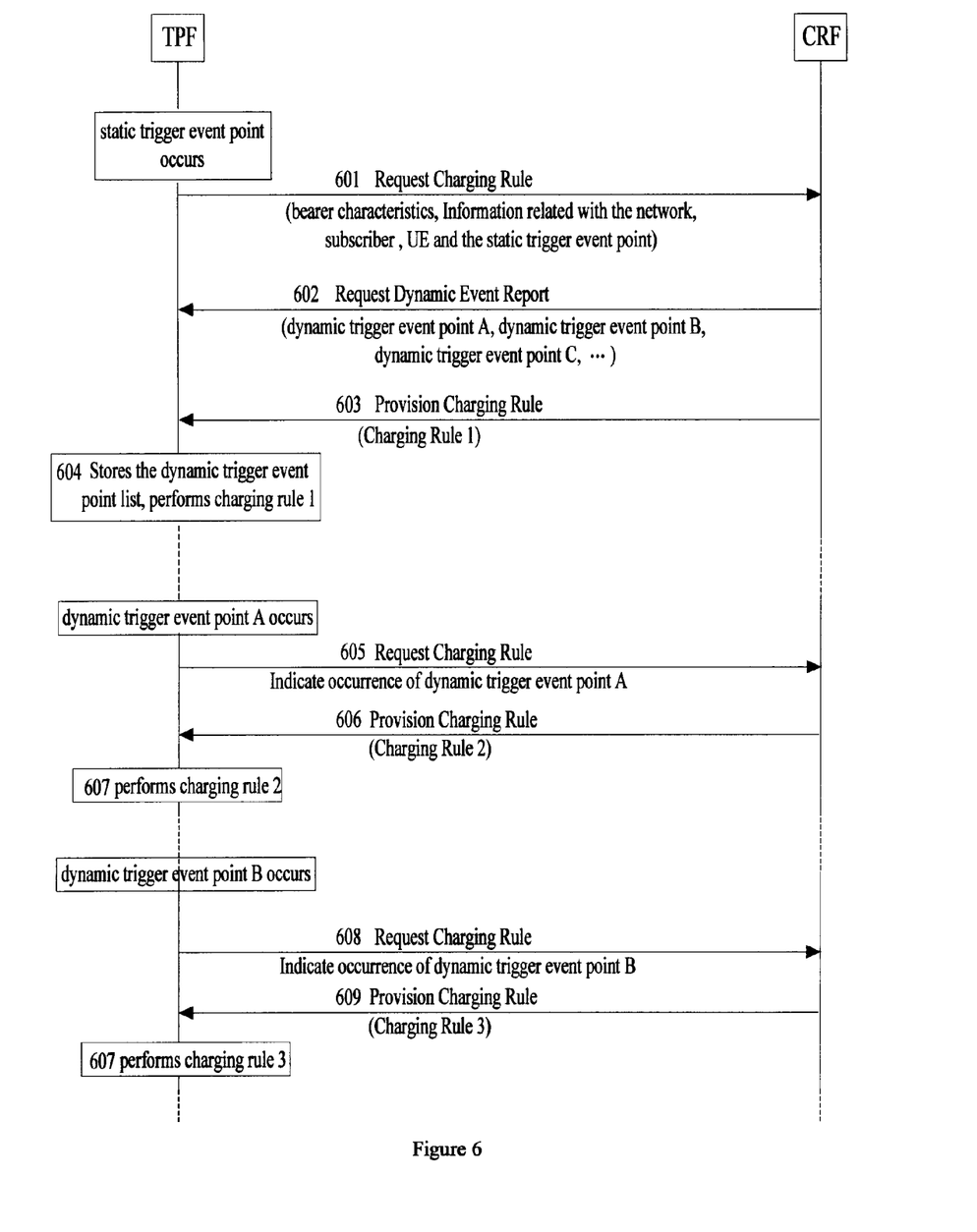
FIG. 6 is a flowchart of a CRF controlling the sending of Charging Rule Request by a TPF in this invention.

FIG. 6 is a flowchart showing the CRF controls the TPF to send the Charging Rule Requests. As shown in FIG. 6, the implementation of the control includes the following steps:

Step 601: Setting a static event trigger enable the TPF to be triggered to request a corresponding charging rule from the CRF in the TPF, such as a static event trigger representing bearer establishment. When the static event trigger is met, the TPF sends the Charging Rule Request to the CRF and the Charging Rule Request carries charging-relevant input information, such as the information related with the subscriber and the UE, the bearer characteristics and the information related with the network. This Charging Rule Request may also carry an event identifier to indicate that the current Charging Rule Request is triggered by the static event trigger.

In addition, more than one static event trigger may be set in the TPF, such as bearer establishment, bearer deletion and so on. When a certain static event trigger thereof is met, the TPF requests the charging rule from the CRF. On the other hand, the TPF may not set the static event trigger therein and periodically sends the Charging Rule Request to the CRF when the bearer is established.

Step 602: After receiving the Charging Rule Request, the CRF sets dynamic event triggers at which the TPF is required to request charging rules, and then sends a Request Dynamic Event Report to the TPF. The Request Dynamic Event Report carries a list of dynamic event triggers, such as dynamic event trigger A, dynamic event trigger B and dynamic event trigger C. These events may be a plurality of various Modify Bearer Events, such as the change of the SGSN, of the Public Land Mobile Network (PLMN), of the Radio Access Technology (RAT) type, of the Traffic Flow Template, and of the QoS.

Step 603: According to the charging-relevant input information carried by the Charging Rule Request, the CRF selects a proper charging rule, and then sends a Provision Charging Rule to the TPF. The Provision Charging Rule may carry the selected charging rule, such as charging rule 1.

The information that the CRF sends to the TPF in steps 602 and 603 may be carried in one message.

Step 604: After receiving the dynamic event trigger list and the charging rule currently selected by the CRF, the TPF stores the dynamic event trigger list, performs charging information statistics according to the selected charging rule, and monitors if any of the dynamic event trigger is met.

Step 605: The TPF monitors the occurrence of a dynamic event trigger A, and then sends a Charging Rule Request to the CRF. The Charging Rule Request carries the occurrence indicator of the dynamic event trigger A.

Step 606: After receiving the Charging Rule Request, the CRF confirms that this Charging Rule Request is triggered by the dynamic event trigger A according to the occurrence indicator of the dynamic event trigger A and selects a proper charging rule also according to the dynamic event trigger A, and then sends the Provision Charging Rule to the TPF. The Provision Charging Rule carries a newly-selected charging rule, such as charging rule 2.

Step 607: After receiving the Provision Charging Rule, the TPF performs charging information statistics according to the Provision Charging Rule.

If there is more than one dynamic event trigger, the TPF continues to monitor if any of other dynamic event triggers is met.

Step 608: the TPF monitors the occurrence of the dynamic event trigger B, and then sends the Charging Rule Request to the CRF. The Charging Rule Request carries the occurrence indicator of the dynamic event trigger B.

Step 609: After receiving the Charging Rule Request, the CRF confirms that this Charging Rule Request is triggered by the dynamic event trigger B according to the occurrence indicator of the dynamic event trigger B and selects a proper charging rule also according to the dynamic event trigger B, and then the CRF sends the Provision Charging Rule to the TPF. The Provision Charging Rule carries a newly-selected charging rule, such as charging rule 3.

Step 610: After receiving the Provision Charging Rule, the TPF take statistics of the charging information according to the Provision Charging Rule.

The subsequent flow is similar to the above and no further description is necessary.

Besides, during a same session, the same session means the same PDP Context in a GPRS network. The CRF may set in the same session dynamic event triggers more than once and send these dynamic event triggers to the TPF. For instance, when receiving charging-relevant input information from the AF or the OCS, the CRF determines whether it is needed to set a new dynamic event trigger according to the charging-relevant input information, if yes, the CRF sets a new dynamic event trigger and sends the point to the TPF. After receiving the new dynamic event trigger, the TPF stores the new dynamic event trigger and monitors occurrence of the dynamic event trigger.

Moreover, since the static event triggers for requesting charging rule from the CRF may be set in the TPF, such routine events of bearer change as bearer establishment, bearer modification, bearer deletion, occurrence of events when a fixed value of flow or time duration is reached and so on, may be reported to the CRF directly by pre-configuring static event triggers in TPF and there is no need for the CRF to send dynamic event triggers to the TPF. For some operators or service providers, there are usually some routine events of bearer change; for example, it is always required for the TPF to report to the CRF when the service flow reaches 10M, or when the service has been activated for 100 minutes, without any other event point requiring dynamic configuration. In this case, only appropriate static event triggers are pre-configured in the TPF while no dynamic event trigger will be issued by the CRF such that the signaling load between the TPF and the CRF can be reduced.

Figure 7:
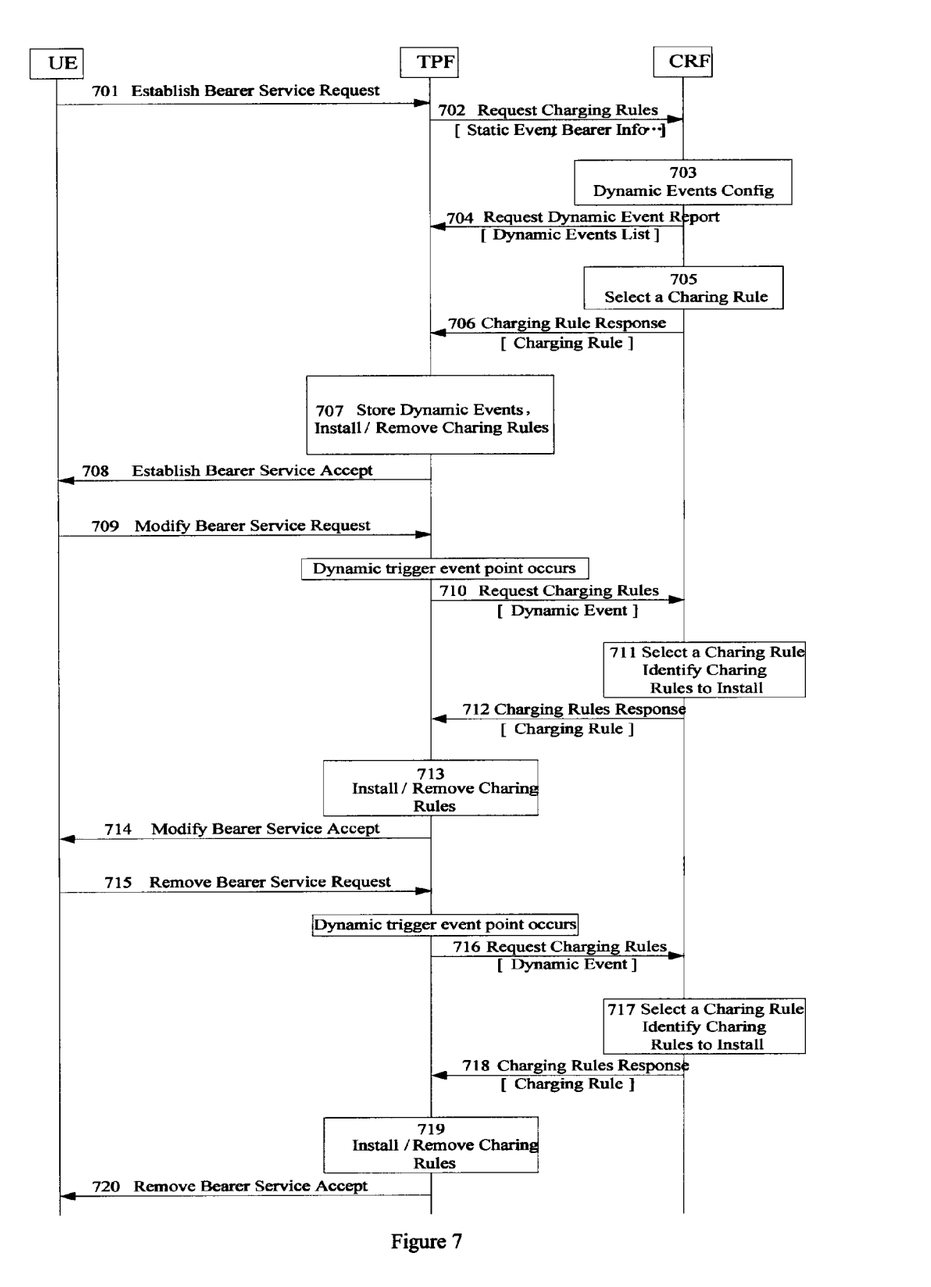
FIG. 7 is a schematic diagram illustrating Embodiment 1 of this invention.

FIG. 7 is a schematic diagram illustrating Embodiment 1 of this invention, where the static event trigger for the TPF to request a charging rule from the CRF is set as bearer establishment, the CRF set the dynamic event triggers at which the TPF is required to send the Charging Rule Request to the CRF when the bearer is modified or removed, and the implementing procedure showing the CRF controls the TPF to send the Charging Rule Request includes the following steps:

Step 701: The UE sends an Establish Bearer Service Request to the TPF. In a GPRS network the corresponding step is that the GGSN receives Create PDP Context Request.

Step 702: After receiving Establish Bearer Service Request, the TPF confirms the occurrence of a static event trigger, and then sends the Charging Rule Request to the CRF. The Charging Rule Request carries the charging-relevant input information, such as the relevant information of a subscriber and the UE, bearer characteristics and network information. The request may also carry an event identifier for indicating that the current Charging Rule Request is triggered by a static event trigger.

Steps 703~704: After receiving the Charging Rule Request, the CRF confirms according to the event identifier that Charging Rule Request is triggered by a static event trigger, sets a dynamic event trigger list including bearer modification and bearer deletion, and then sends the Request Dynamic Event Report to the TPF. The Request Dynamic Event Report carries the dynamic event trigger list. In addition, the CRF may set a plurality of various values, such as various QoS parameter priorities, in the dynamic event trigger of the bearer modification and each value may be an independent dynamic event trigger.

Steps 705~706: The CRF selects a proper charging rule according to the charging-relevant input information carried by the Charging Rule Request, and then sends the Charging Rule Response to the TPF. The Charging Rule Response carries the selected charging rule.

Steps 707~708: After receiving the dynamic event trigger list set by the CRF and the charging rule selected by the CRF, the TPF stores the dynamic event trigger list, performs charging information statistics according to the charging rule, and monitors occurrence of the dynamic event triggers. The TPF returns an Establish Bearer Service Accept message to the UE, accepts an Establish Bearer Service Request initiated by the UE and continues with the subsequent steps of the flow of the bearer establishment.

Step 709: After a while, the UE sends a Modify Bearer Service Request to the TPF. In a GPRS network the corresponding step is that the GGSN receives Update PDP Context Request.

Step 710: After receiving the Modify Bearer Service Request, the TPF confirms that the dynamic event trigger of the bearer modification in the dynamic event trigger list has occurred, and then sends the Charging Rule Request to the CRF. The Charging Rule Request carries the occurrence indicator of the dynamic event trigger.

Steps 711~712: After receiving the Charging Rule Request, the CRF confirms according to the occurrence indicator of dynamic event trigger that the Charging Rule Request is triggered by the dynamic event trigger of bearer modification, selects a proper charging rule according to the bearer modification, and then sends the Provision Charging Rule to the TPF. The Provision Charging Rule may carry the selected charging rule.

Steps 713~714: After receiving the Provision Charging Rule, the TPF installs a new charging rule according to the charging rule selected by the CRF, or removes the original charging rule, or installs a new charging rule while deleting the original one, then returns the Modify Bearer Service Accept to the UE, accepts the Modify Bearer Service Request initiated by the UE, and continues with the subsequent steps of the flow of the bearer modification.

Step 715: After a while, the UE sends a Remove Bearer Service Request to the TPF. In a GPRS network the corresponding step is that the GGSN receives Delete PDP Context Request.

Step 716: After receiving the Remove Bearer Service Request, the TPF confirms that the dynamic event trigger of bearer deletion in the dynamic event trigger list has occurred, and then sends the Charging Rule Request to the CRF. The Charging Rule Request carries the occurrence indicator of dynamic event trigger.

Steps 717~718: After receiving the Charging Rule Request, the CRF confirms that the Charging Rule Request is triggered by the dynamic event trigger of bearer deletion according to the occurrence indicator of dynamic event trigger, selects the proper charging rule according to bearer deletion, and then sends the Provision Charging Rule to the TPF. The Provision Charging Rule may carry the selected charging rule.

Steps 719~720: After receiving the Provision Charging Rule, the CRF installs a new charging rule according to the charging rule selected by the CRF, or deletes the original charging rule, or installs a new charging rule while deleting the original one, and then returns the Remove Bearer Service Accept message to the UE, accepts the Remove Bearer Service Request initiated by the UE and continues with the subsequent steps of the flow of the bearer deletion.

In the prior art, the AF sends the Application/Service Data Flow Charging Information to the CRF as the charging-relevant input information for the CRF to the select charging rules. Then, in the method provided in the preferred embodiments of the preferred embodiments of the present invention, the AF sends the Application/Service Data Flow Charging Information to the CRF as the input information for the CRF to dynamically set dynamic event triggers.

Figure 8:
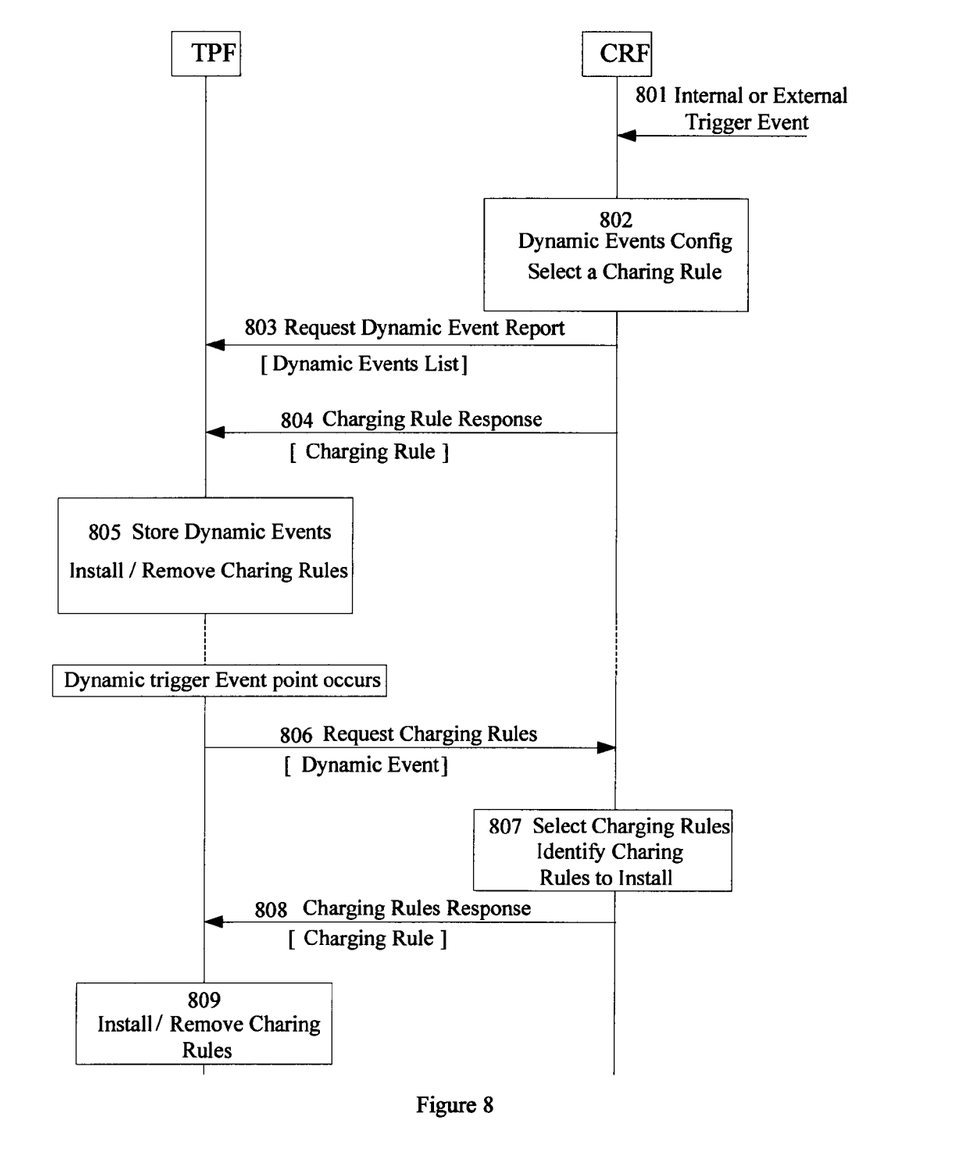
FIG. 8 is a schematic diagram illustrating Embodiment 2 of this invention.

FIG. 8 is a schematic diagram illustrating Embodiment 2 of this invention, as shown in FIG. 8, the implementing procedure in the present embodiment for the CRF to issue a dynamic event trigger to the TPF includes the following steps:

Step 801: The CRF receives a certain Internal or External Trigger Event. For example, the AF provides an accredited activity for the users. If the data flow of a certain service of this AF visited by one user reaches a set value, the subsequent charging rate of the user's to this service decreases. In this case, the AF requires the CRF to adopt a favorable charging rate to take charging information statistics for subsequent data flow when the data flow of a certain service filter reaches a set value. Or, if the duration for which a user has accessed a certain service of this AF reaches a set value, the subsequent charging rate of the user's to this service decreases. In this case, the AF requires the CRF to adopt a favorable charging rate to perform charging information statistics for subsequent data flow when the duration for which a certain service filter has been used arrives at a set value.

Step 802: The CRF sets a dynamic event trigger, for instance, as when the data flow of a certain service filter reaches a set value or as when a certain service filter has been used for a set time span. Furthermore, the CRF may select a proper charging rule according to the information currently acquired, such as the User/Terminal information, bearer characteristics, and network information provided by the TPF.

Step 803: the CRF sends the Request Dynamic Event Report carrying the current dynamic event trigger list to the TPF and requires the TPF to request a charging rule from the CRF when a dynamic event trigger thereof is met.

Step 804: The CRF sends the Provision Charging Rule to the TPF and the Provision Charging Rule carries the charging rule currently selected. This step is optional.

Sep 805: The TPF receives the current dynamic event trigger list set by the CRF and stores this dynamic event trigger list. If the TPF also receives the Provision Charging Rule, the TPF installs a new charging rule according to the charging rule selected by the CRF, or deletes the original charging rule, or installs a new charging rule while deleting the original one.

Step 806: After a while, the TPF monitors the occurrence of a dynamic event trigger, and then sends the Charging Rule Request to the CRF. The Charging Rule Request carries an occurrence indicator of dynamic event trigger.

Step 807~808: After receiving the Charging Rule Request, the CRF confirms that which dynamic event trigger triggers this Charging Rule Request according to the occurrence indicator of the dynamic event trigger. For example, the event may be an event that the data flow of a certain service filter reaches the set value or an event that a certain service filter has been in use for a set time span. The CRF then selects a proper charging rule according to this dynamic event trigger and send the Provision Charging Rule to the TPF. The Provision Charging Rule may carry the selected charging rule.

Step 809: After receiving the Provision Charging Rule, the TPF installs a new charging rule according to the charging rule selected by the CRF, or deletes the original charging rule, or installs a new charging rule while deleting the original one.

In addition, the CRF may also dynamically set dynamic event triggers according to the charging-relevant input information sent by the OCS concerning users' credit. The corresponding flow is basically the same as the above and further description is not necessary.

In short, the above description is just a preferred embodiment of this invention and not to be construed as limits to the protection scope thereof.

What is claimed is:

1. A method for controlling charging of packet data service, comprising:
   receiving, by a Traffic Plane Function (TPF), event triggers to control the TPF from a Charging Rule Function (CRF), wherein the event triggers are determined by the CRF;
   determining, by the TPF, whether a request for charging rule is required to be sent to the CRF according to the event triggers; and
   sending, by the TPF, the request for charging rule to the CRF, if one or more of the event triggers received from the CRF is met,
   wherein the event triggers comprise at least one of a change of a Serving GPRS Support Node (SGSN), a change of a Public Land Mobile Network (PLMN), a change of a Radio Access Technology (RAT) type, a change of a Traffic Flow Template (TFT), or a change of Quality of Service (QoS).

2. The method according to claim 1, wherein the request for charging rule carries an event identifier indicating the met event trigger.

3. The method according to claim 1, wherein the request for charging rule carries charging-relevant input information which is provided to the CRF for charging rule selection.

4. The method according to claim 1, further comprising:
   receiving, by the TPF, a charging rule from the CRF in a charging rule provision procedure.

5. A communication system for controlling charging of packet data service, comprising:

a Traffic Plane Function (TPF) which is in communication with a Charging Rule Function (CRF), wherein the TPF is configured to:
  receive, from the CRF, event triggers to control the TPF, wherein the event triggers are determined by the CRF;
  determine whether a request for charging rule is required to be sent to the CRF according to the event triggers; and
  send the request for charging rule to the CRF if one or more of the event triggers received from the CRF is met,
wherein the event triggers comprise at least one of a change of a Serving GPRS Support Node (SGSN), a change of a Public Land Mobile Network (PLMN), a change of a Radio Access Technology (RAT) type, a change of a Traffic Flow Template (TFT), or a change of Quality of Service (QoS).

6. The communication system according to claim 5, wherein the request for charging rule carries an event identifier indicating met event trigger.

7. The communication system according to claim 5, wherein the request for charging rule carries charging-relevant input information which is provided to the CRF for charging rule selection.

8. The communication system according to claim 5, the TPF is further configured to receive a charging rule from the CRF in a charging rule provision procedure.

9. The method according to claim 4, further comprising:
  performing, by the TPF, charging information statistics according to the charging rule.

10. The communication system according to claim 8, the TPF is further configured to perform charging information statistics according to the charging rule.

11. The communication system according to claim 5, wherein the communication system is a general packet radio service (GPRS) communication system, and the TPF is a GPRS Support Node (GGSN).

* * * * *